(12) United States Patent
McConnell

(10) Patent No.: US 6,536,401 B2
(45) Date of Patent: Mar. 25, 2003

(54) FUEL CUTOFF SWITCH SYSTEM

(75) Inventor: Douglas A. McConnell, Rochester Hills, MI (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 0 days.

(21) Appl. No.: 09/847,242

(22) Filed: May 2, 2001

(65) Prior Publication Data

US 2002/0017268 A1 Feb. 14, 2002

Related U.S. Application Data

(60) Provisional application No. 60/223,962, filed on Aug. 9, 2000.

(51) Int. Cl.⁷ .............................................. F02B 77/00
(52) U.S. Cl. .......................... 123/198 D; 123/198 DB; 180/282; 701/45
(58) Field of Search ..................... 180/282; 123/198 D, 123/198 DB; 701/45

(56) References Cited

U.S. PATENT DOCUMENTS

| | | | | |
|---|---|---|---|---|
| 5,394,328 A | | 2/1995 | Huang | |
| 5,490,066 A | * | 2/1996 | Gioutsos et al. | 180/282 |
| 5,606,501 A | | 2/1997 | Gioutsos et al. | |
| 5,732,374 A | * | 3/1998 | Ohm | 280/735 |
| 5,797,111 A | * | 8/1998 | Halasz et al. | 701/103 |
| 5,900,807 A | * | 5/1999 | Moriyama et al. | 180/282 |
| 5,948,032 A | * | 9/1999 | Huang et al. | 180/282 |
| 6,076,028 A | * | 6/2000 | Donnelly et al. | 701/45 |
| 6,170,864 B1 | | 1/2001 | Fujita et al. | |

FOREIGN PATENT DOCUMENTS

| | | | |
|---|---|---|---|
| DE | 19520608 A1 | 12/1996 | |
| DE | 19710451 A1 | 4/1998 | |
| DE | 19751336 A1 | 6/1998 | |
| EP | 0536996 A1 | 4/1993 | |
| GB | 2292126 A | * 2/1996 | B60R/21/00 |

\* cited by examiner

*Primary Examiner*—Noah P. Kamen

(57) ABSTRACT

The method of controlling fuel supply comprises the steps of detecting a value related to velocity of a vehicle along a first path and detecting a value related to velocity along a second path transverse to the first path. The detected values are then combined and compared to a threshold. The fuel supply is then controlled based on the comparison of the combined values with the threshold. Using this method, a fuel safety system comprises a fuel system of a vehicle, a fuel cutoff switch controlling the transmission of fuel through the fuel system, a sensor detecting a value related to velocity of the vehicle along the first path, and a sensor detecting a value related to velocity of the vehicle along a second path transverse to the first path. A control unit combines the detected values and activates the fuel cutoff switch based on the comparison.

10 Claims, 3 Drawing Sheets

FUEL CUTOFF SWITCH SYSTEM

This application claims priority to Provisional Patent Application Serial No. 60/223,962 filed Aug. 9, 2000.

BACKGROUND OF THE INVENTION

This invention relates to a method and system for terminating the supply of fuel to an engine during a vehicle crash.

In a vehicle accident, it is desirable to cutoff fuel to a vehicle engine. One current system employs an inertia switch that detects sudden changes in vehicle velocity in a single direction. When the vehicle suddenly changes velocity, the inertia switch detects this change as an accident and shuts off fuel to the vehicle engine.

The current system provides limited information about the nature of the accident and may activate at less than optimal moments of vehicle operation. That is, the fuel could be shut off, when no need was truly experienced. Of course, the fuel being shut off for a minor accident, or an accident in a direction unlikely to raise concerns of leaking fuel, would be undesirable. A need therefore exists for a fuel cutoff switch system that obtains greater information about the vehicle crash to provide enhanced performance of the system.

SUMMARY OF THE INVENTION

The fuel cutoff switch method and system obtains information from a plurality of sensors. The fuel safety system comprises a fuel system of a vehicle and a fuel cutoff switch that controls the transmission of fuel through the fuel system. A first sensor detects a value related to velocity of the vehicle along a first path. A second sensor detects a value related to velocity along a second path transverse to the first path. A control unit combines the detected values and activates the fuel cutoff switch based on a comparison of the combined detected values with a threshold. This system accordingly provides a greater amount of information than provided by the prior fuel cutoff switch, which detects changes in velocity only along one path. By examining the combination of detected values, the system examines the total energy experienced by the vehicle in an accident. This analysis is particularly useful for front impact events.

The system may combine the detected values through their summation. Moreover, to avoid inadvertent activation of the fuel cutoff switch, the detected values may be modified by a dampening value. This modification may simply be a subtraction of the dampening value from the detected values.

Additionally, the system may compare the combined detected values with a second threshold for rear impact events, which is lower than the first threshold. The system detects the direction of velocity along the first path. In this way, the system may distinguish between front-end collisions and rear-end collisions. When the system detects a rear end collision, the system activates the fuel cutoff switch based on a comparison the detected value relating to velocity along the first path with the second threshold.

The system is also useful in the activation of the fuel cutoff switch in side collisions. The combined detected values are compared with a third threshold for such collisions. The system compares the detected value relating to velocity along the second path with the third threshold. The system need not determine the direction of the side impact since the effect on the vehicle tends to be the same. The fuel cutoff switch is then activated based on this comparison to this third threshold.

The system may thus employ a number of thresholds to examine the type and severity of the event to determine whether an accident has occurred requiring the activation of the fuel cutoff switch. The system detects a value related to velocity of a vehicle along a first path, detects a value related to velocity of the vehicle along a second path transverse to the first path, combines the detected values, and modifies the detected values by a dampening value. Based on the comparison of these detected values with various thresholds, the system may use different thresholds to activate the fuel cutoff switch for front, side, and rear impacts. Moreover, the use of the dampening value allows activation of the fuel cutoff switch for only sufficiently serious accidents that require fuel supply termination.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
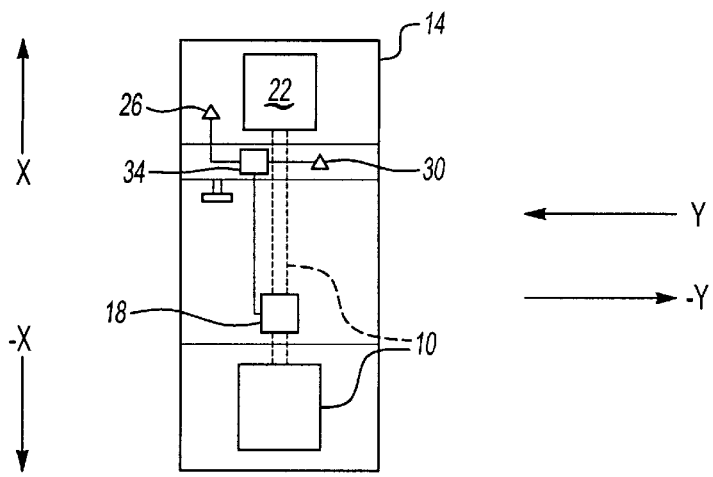
FIG. 1 shows an embodiment of the invention, including fuel system, fuel cutoff switch, first and second sensors, and control unit.

An embodiment of the invention is illustrated schematically in FIG. 1. The fuel safety system comprises fuel system 10 of vehicle 14 and fuel cutoff switch 18 that controls the transmission of fuel through the fuel system to vehicle engine 22. First sensor 26 detects a value related to velocity of the vehicle along a first path, such as the path designated by arrow "X" and arrow "–X." The first path is preferably along the path of forward travel of vehicle 14. Second sensor 30 detects a value related to velocity along a second path transverse to the first path, which is shown as either arrow "Y" and arrow "–Y". The second path is preferably along the path transverse or orthagonal with first path. First sensor 26 and second sensor 30 are preferably the acceleration sensors used in air bag deployment systems, which are already installed in most vehicles.

Control unit 34 combines the detected values and activates the fuel cutoff switch based on a comparison of the combined detected values with a threshold. Control unit 34 may also be the same control unit used for air bag deployment systems. Hence, the system uses many of the same existing components that are installed on the vehicle as part of an air bag deployment system, thereby reducing the total cost of the system. Control unit 34 may "sleep" until a predetermined acceleration value is met whereupon control unit 34 "wakes up". A separate algorithm may control the "wake up" of control unit 34 and may also reset the unit.

The invention provides a greater amount of information than provided by the prior fuel cutoff switch alone, which detects changes in velocity only along one path. By examining the combination of detected values, the system examines the total energy experienced by the vehicle in an accident. Moreover, as explained further below, the invention may distinguish between front, side, and rear crash events to determine whether to activate fuel cutoff switch 18 and may even employ different thresholds for each type of event.

Figure 2:
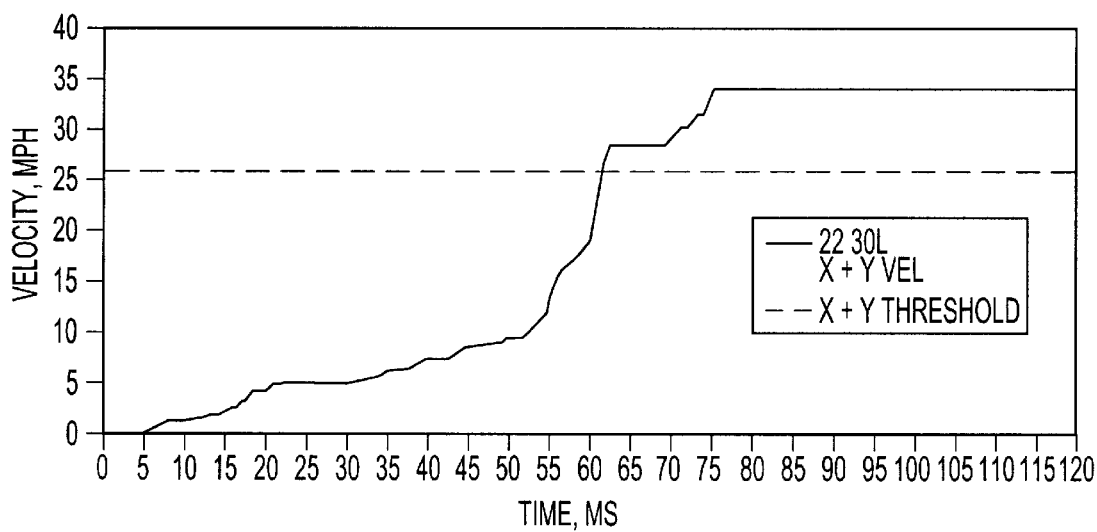
FIG. 2 shows the first threshold of the embodiment of FIG. 1 in relation to a front-end collision.
Figure 3:
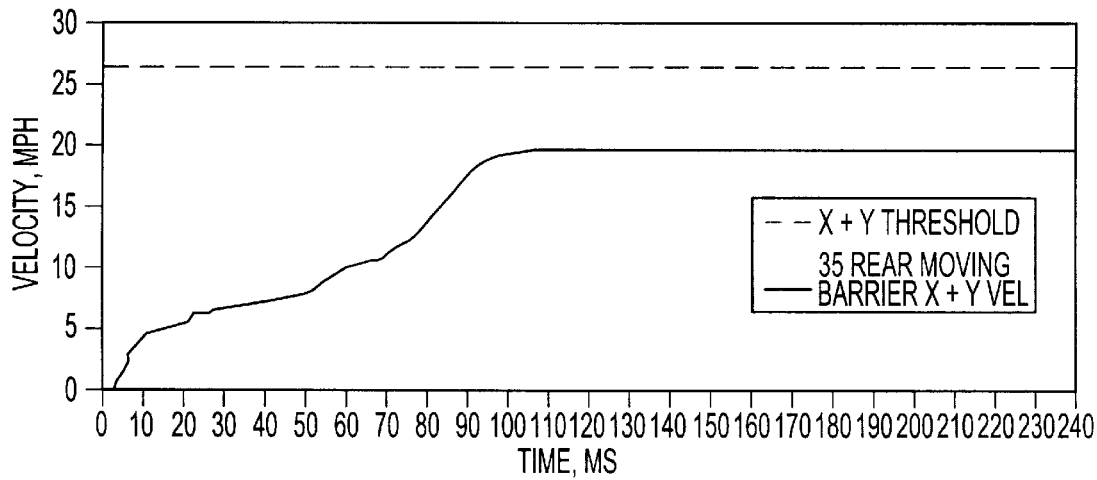
FIG. 3 shows the first threshold of FIG. 1 in relation to a rear-end collision.

The method of controlling fuel supply comprises the steps of detecting a value related to velocity of a vehicle along a first path and detecting a value related to velocity of a vehicle along a second path transverse to the first path. The two values are then combined and compared to a threshold, which may be predetermined and may vary from vehicle to vehicle. The fuel supply is then controlled based on the comparison. Combining the detected values may comprise summing the detected values. As seen in FIG. 2, in the event the combined values exceed the threshold, fuel cutoff switch 18 is activated to prevent the supply of fuel to the vehicle engine and related elements. This methodology is particularly useful in triggering fuel cutoff switch 18 in the event of a front end collision.

The detected values are preferably modified by a dampening value. This value permits the system to absorb and ignore shocks and sudden changes to vehicle velocity that may occur when vehicle 14 hits potholes or road debris. It is generally undesirably to trigger fuel cutoff switch 18 under this situation. The modification may be a subtraction of an acceleration constant from changes in velocity over time as detected by sensors 26 and 30 and determined by control unit 34.

Figure 4:
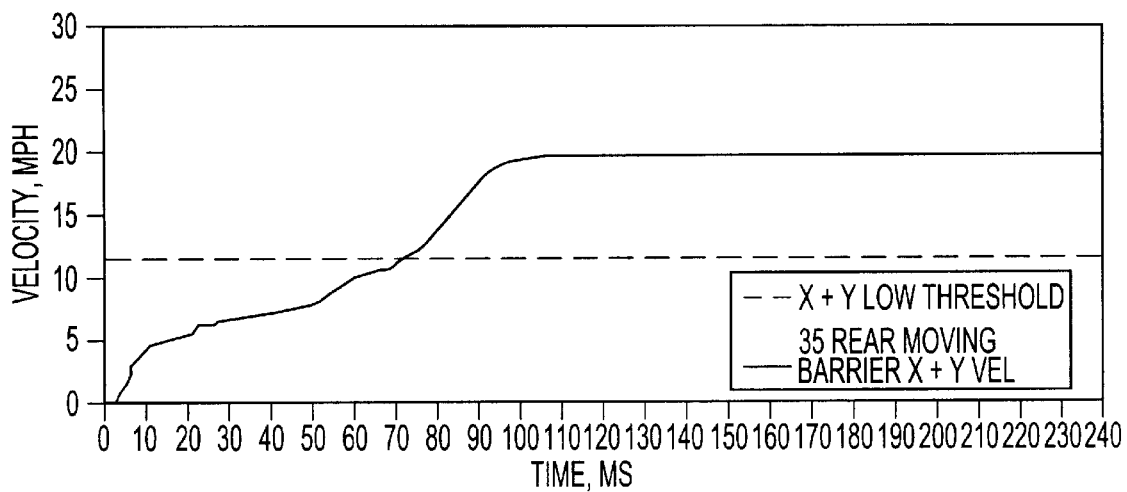
FIG. 4 shows the second threshold in relation to a rear-end collision, comparing a combination of detected values along a first path and second path with the second threshold.

Generally, manufacturers require a lower threshold to trigger fuel cutoff switch 18 for rear-end collisions than for front-end collisions. FIG. 2 illustrates that using the same threshold of FIG. 1 to trigger activation of fuel cutoff switch 18 will not prove effective at activating fuel cutoff switch 18 under appropriate circumstances. Accordingly, the invention distinguishes front-end events from rear-end events and then compares the system to a second threshold. As seen in FIG. 4, the second threshold is generally lower than the first threshold to permit for the triggering of fuel cutoff switch 1.8 for lower energy collisions. The comparison with the second threshold may occur when control unit 34 determines the direction of velocity along the first path. In the event control unit 34 detects a rear-end event, control unit 34 then compares the combination of detected value relating to velocity along the first path and the detected value relating to velocity along the second path with second threshold. Fuel cutoff switch 18 activates based on the comparison.

Figure 5:
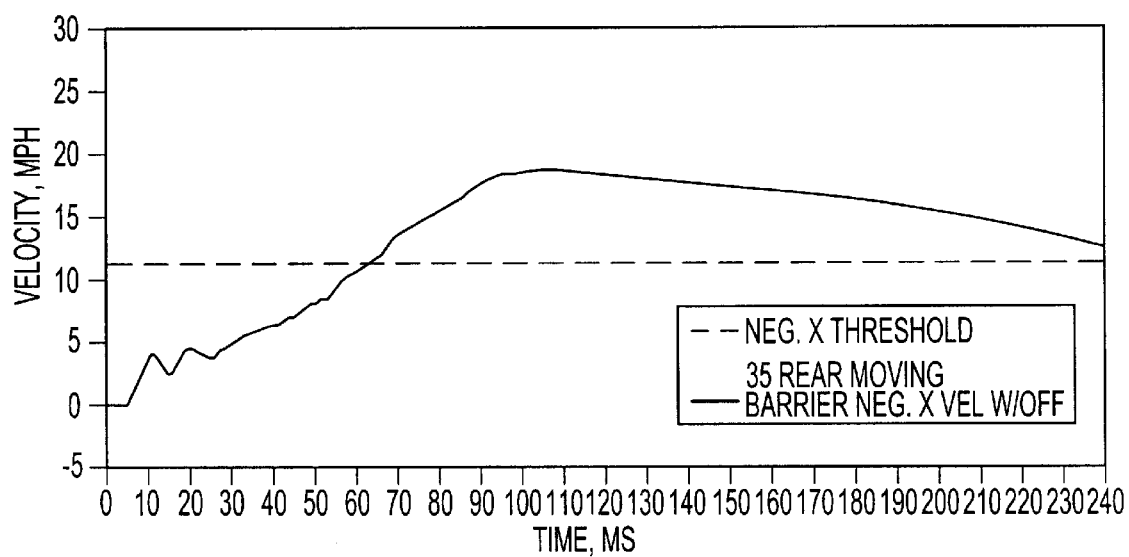
FIG. 5 shows an alternative embodiment of the invention involving the second threshold in relation to a rear-end collision and comparing a detected value along a first path for a rear-end collision with the second threshold.

Alternatively, as seen in FIG. 5, rather than combining the detected values relating to velocity of both first path and second path, if control unit 34 detects rear-end event, then the control unit 34 may activate fuel cutoff switch 18 if the detected value along only the first path exceeds the second threshold.

Figure 6:
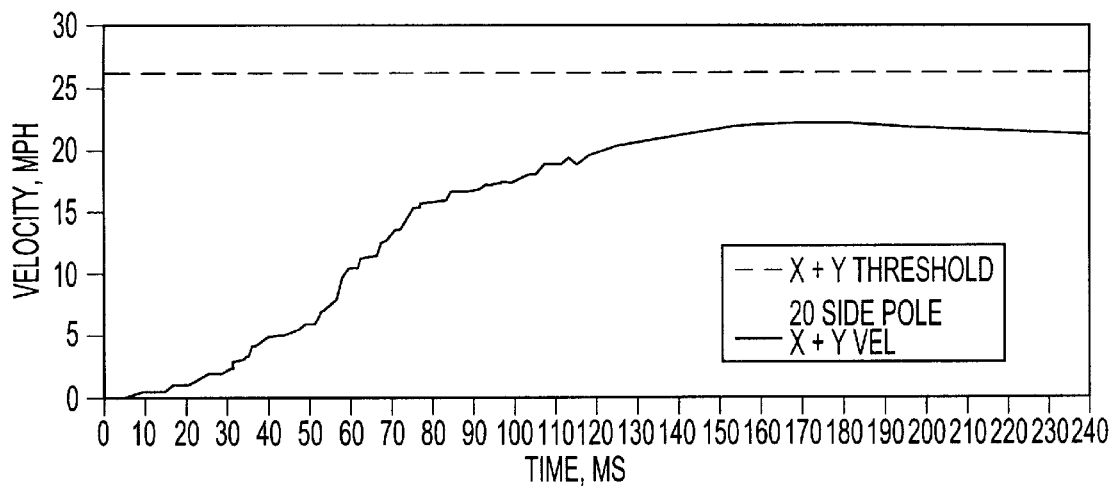
FIG. 6 shows the first threshold in relation to a side-impact collision, comparing a combination of detected values along a first path and second path with the first threshold.
Figure 7:
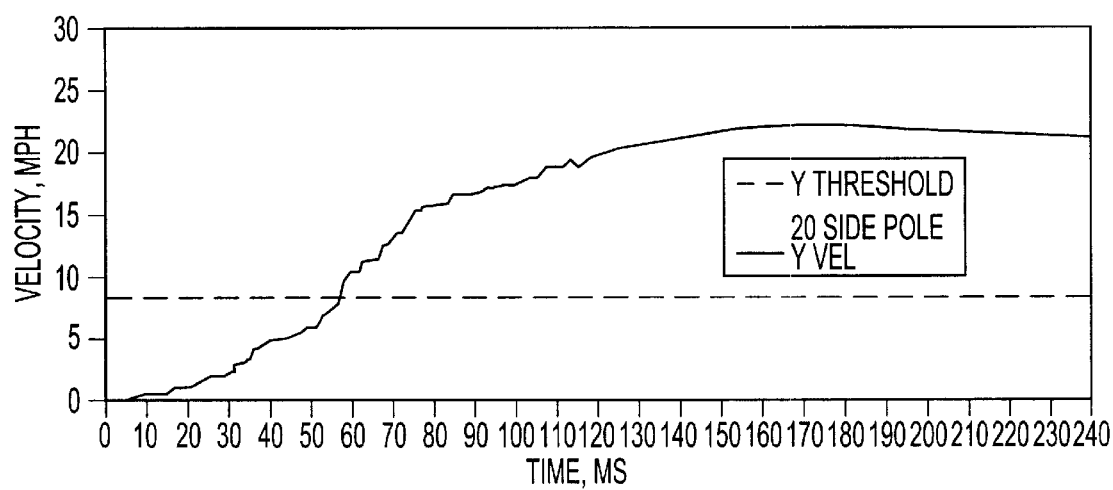
FIG. 7 shows the third threshold in relation to a side-impact collision, comparing a detected value relating to velocity along the second path with the third threshold.

Another embodiment of the invention comprises comparing combined detected values with a third threshold for side impact events. During such an event, and as seen in FIG. 6, the threshold for front-end collisions as pictured in FIG. 1 does not serve as a useful threshold for triggering fuel cutoff switch 34. Accordingly, the detected value relating to velocity along the second path is compared with third threshold as seen in FIG. 7. If this third threshold is exceeded, control unit 34 activates fuel cutoff switch 18.

Again, as taught above, rather than compare only the detected value relating to velocity along the second path alone, this value may be combined with the detected value relating to velocity along the first path and then compared to the third threshold.

The foregoing can be combined into an embodiment for controlling fuel supply comprising the steps of detecting a value related to velocity of a vehicle along a first path and detecting a value related to velocity of a vehicle along a second path transverse to the first path. Modifying the detected values by a dampening value and then combining the detected values. The combined values may be obtained by summation. The detected values are then compared to a first threshold. If the first threshold is exceeded, a front impact is detected and the fuel supply controlled based on the comparison.

In the event the first threshold is not exceeded, the combined values are compared to a second threshold for rear impact events. This threshold is generally lower than the first threshold for front-end events. To determine whether a rear event has occurred sufficient to require actuation of fuel cutoff switch, the direction of the value relating to velocity along the first path is determined and then compared to the second threshold. Alternatively, this value relating to velocity along the first path may be combined with the value relating to velocity along the second path and compared with the second threshold. The fuel supply is controlled based on the comparison.

Finally, the detected value relating to velocity along the second path may be compared with a third threshold for side impact events. If this third threshold is exceeded, then the fuel cutoff switch 34 is activated.

The thresholds used for this invention will vary from vehicle to vehicle but may be determined by individuals with ordinary skill in the art. Additionally, the order of steps may also be varied to effect the same invention. The described order of steps is thus by no means intended to limit the scope of this invention.

The aforementioned description is exemplary rather then limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. A method of controlling fuel supply;

detecting a value related to velocity of a vehicle along a first path relating to forward travel of a vehicle;

detecting a value related to velocity of a vehicle along a second path generally transverse to the first path;

combining the detected values;

comparing the combined detected values to a first threshold;

comparing at least one of the detected values with a second threshold; and controlling fuel supply based on the comparison.

2. The method of claim 1 including the step of determining the direction of velocity along the first path.

3. The method of claim 2 wherein fuel supply is controlled based on the comparison with at least one of the detected values with the second threshold.

4. The method of claim 1 including the step of comparing at least one of the detected values with a third threshold.

5. The method of claim herein fuel supply is controlled based on the comparison of at least one of the detected values with the third threshold.

6. A method of controlling fuel supply;

detecting a value related to velocity of a vehicle along a first path relating to forward travel of a vehicle;

detecting a value related to velocity of a vehicle along a second path generally transverse to the first path;

combining the detected values;

modifying the detected values by a dampening value;

comparing the combined detected values to a first threshold;

comparing at least one of the detected values with a second threshold; and controlling fuel supply based on the comparison.

7. The method of claim 6 including the step of determining the direction of velocity along the first path.

8. The method of claim 7 wherein fuel supply is controlled based on the comparison with at least one of the detected values with the second threshold.

9. The method of claim 6 including the step of comparing at least one of the detected values with a third threshold.

10. The method of claim 9 wherein fuel supply is controlled based on the comparison of at least one of the detected values with the third threshold.

* * * * *